United States Patent Office 3,165,558
Patented Jan. 12, 1965

3,165,558
PRODUCTION OF THERMOSETTING, AROMATIC HYDROCARBON RESINS
Minoru Imoto, 181–2 Okashinmachi, and Ching Yun Huang, 249 Okashinmachi, both of Maikata-shi, Osaka-fu, Japan; Teiichi Tanigaki, 1156–23 Okamoto, Motoyama-machi, Higashi-ku, Kobe-shi, Japan; and Tadao Kuraya, 20 Chika-machi, Kita-ku, Osaka-shi, Japan
No Drawing. Filed Mar. 30, 1961, Ser. No. 99,376
Claims priority, application Japan, Mar. 31, 1960, 11,342/60
7 Claims. (Cl. 260—823)

This invention relates to the production of thermosetting synthetic resins, and more particularly it relates to the production of new thermosetting, aromatic hydrocarbon resins of new composition and excellent properties, in combination, for many useful purposes.

The thermosetting resins known heretofore, for example, resins of phenol, urea, melamine, unsaturated polyester, epoxy, etc., have contained elements of oxygen and nitrogen in addition to those of carbon and hydrogen. Moreover, atomic groups of elements other than carbon and hydrogen have taken the principal part in the resinification process of these known resin materials. For example, such functional groups as the hydroxyl group of phenolic resins, the amino group of urea or melamine resins, and the epoxy group of epoxy resins have participated in the reaction and have, moreover, remained unchanged in the hardened (thermoset) molecules. Accordingly, in the thermoset resins known heretofore, such as resins of phenol, urea, melamine, epoxy, unsaturated polyester, etc., elements other than carbon and hydrogen have been included in the compositions of these resins.

While on one hand, the atomic-group, functional groups composed of these elements of oxygen and nitrogen have high reactivity, they become a factor which lowers the performance of the resins. This disadvantage may be seen in, for example, phenolic resins, wherein the hydroxyl group has poor resistance against water, oxidation, and alkalis, and in urea resins, wherein the amino group and ketone group cause thermal cracking of these resins and the lowering of their resistance against chemicals. As a further example, while epoxy resins have good adhesivity and high resistance against chemicals, they have low heat resistance. In this manner, advantages and disadvantages in performance appear in the functional groups.

If thermosetting resins could be produced with only hydrocarbons, such resins would have excellent electric insulating property, high water resistance, and high resistance against chemicals, as the resin industry has unanimously predicted. Such resins would not be merely novel macromolecular materials but would also be materials whose appearance has been long awaited for use in the latest, precise, scientific instruments and equipment. After overcoming considerable difficulties, the present inventors have succeeded in producing thermosetting hydrocarbon resins and in developing a process of producing the same.

It is an object of the present invention to provide new thermosetting hydrocarbon resins of new composition comprising only hydrocarbons.

It is another object of the invention to provide a process of producing the above-stated thermosetting hydrocarbon resins of new composition.

The new thermosetting, aromatic hydrocarbon resins according to the present invention may be produced, in general, by causing an aromatic hydrocarbon to react with formalin or a paraformaldehyde in the presence of an acidic catalyst and causing an aromatic hydrocarbon of another kind with trifunctional or higher functional characteristic or its formaldehyde resin to be after-condensed in the oxygen-containing, aromatic hydrocarbon formaldehyde resin thus produced.

The details of the invention will be more clearly apparent by reference to the following detailed description.

The method of the present invention includes the step of causing an oxygen-containing, aromatic hydrocarbon formaldehyde resin and an aromatic hydrocarbon with trifunctional characteristic to react in the presence of an acidic catalyst. Examples of compounds which may be used as the aromatic hydrocarbon to compose the oxygen-containing, aromatic hydrocarbon formaldehyde resin through the reaction of an aromatic hydrocarbon with formalin are as follows: monocyclic, 1 to 4 alkyl substituent products of aromatic hydrocarbons, such as toluene, xylene, cymene, mesitylene, and durene, and aromatic hydrocarbons such as naphthalene, alpha-methylnaphthalene, betamethylnaphthalene, and anthracene.

When such aromatic hydrocarbons, either singly or as a mixture, are caused to react with formalin or with paraformaldehyde at atmospheric pressure or under pressure in the presence of a catalyst comprising sulfuric acid, hydrochloric acid, perchloric acid, phosphoric acid, and boron trifluoride, either single or as mixture, an oxygen-containing, aromatic hydrocarbon formaldehyde resin is obtained. The oxygen-containing factor of this resin is due to the ether ($-CH_2OCH_2-$) and acetal $$(-CH_2OCH_2OCH_2-)$$

bonds which bind the aromatic hydrocarbon nucleus, and can be varied at will by suitably selecting the reaction conditions.

Among the polycyclic compounds, however, such compounds as acenaphthene and acenaphthylene, while they similarly react with formalin to form such resins as acenaphthene formaldehyde resin and acenaphthylene formaldehyde resin, the oxygen contents of these resins are relatively low, being of the order of 0.2 to 2 percent. Moreover, when the reaction temperature and quantity of catalyst, as the reaction conditions, are increased, the resin becomes an insoluble, unmeltable resin which has been transformed into a three-dimensional structure. This means, in other words, that acenaphthene and acenaphthylene react with formalin with the reactivity of a trifunctional or higher-functional group.

Accordingly, similarly as in the case of obtaining an insoluble, unmeltable resin of xyleneformaldehydephenol through the reaction and hardening of oxygen-containing xyleneformaldehyde resin and phenol of trifunctional characteristic, as known heretofore, if the initial condensation product (melting point of 150° C. or lower) of acenaphthene, acenaphthylene, or the formaldehyde resin of either is added as the hardening agent in the proportion of one or less molecule per atom of oxygen within the oxygen-containing, aromatic hydrocarbon formaldehyde resin molecule; 0.1 to 2.0 percent of toluene sulfonic acid and/or xylene sulfonic acid is added as a catalyst; and the resulting mixture is heated to a temperature of 140° to 220° C., a vigorous dehydration reaction will occur between the oxygen acting as the oxygen-containing factor and the initial condensation product of the acenaphthene, acenaphthylene, or the formaldehyde resin of either, and, at 190° C., the resulting material, in a few minutes, will become a resin of a state approaching a hardened state. This resin is soluble in aromatic hydrocarbons, carbon disulfide, and carbon tetrachloride.

However, if the heating is continued further for another 20 minutes, the resin will reach an almost totally hardened state and become an insoluble, unmeltable, thermoset resin. If this hardened resin is then subjected to a long period of thermal extraction with an aromatic hydrocarbon, carbon disulfide, and carbon tetrachloride, the elementary analysis of its insoluble and unmeltable part will become that of a composition composed of only carbon and hydrogen.

A soluble and meltable resin produced through reaction at low temperature and with only a small quantity of catalyst can be dissolved directly in an organic solvent and caused to impregnate baking paints, fabrics, and papers for the production of laminated materials. On the other hand, wood flour or pulp in a proportion of 50 percent relative to the said resin can be kneaded and mixed under heat with the said resin by means of a kneader to produce a substance which, when pulverized, becomes a molding material for general use. In either case, the ultimate material will exhibit excellent water resistance, electric insulating property, resistance against chemicals, and high mechanical strength.

In order to indicate still more fully the nature of the present invention, the following examples of procedure are set forth, it being understood that these examples are presented as illustrative only, and that they are not intended to limit the scope of the invention.

Example 1

675 parts of xyleneformaldehyde resin (molecular weight: 450, oxygen content: 9.82%), 200 parts of acenaphthene, and 8.8 parts of xylene sulfonic acid are mixed and heated at 190° C. for 60 minutes, during which the mixture reacts vigorously and undergoes hardening reaction as moisture is released, whereby a solid resin of yellowish-brown color is obtained. When this resin is subjected to thermal extraction with xylene, 95 percent or more of an insoluble, unmeltable resin remains. The elementary analysis of the insoluble, unmeltable resin is 92.58 percent of carbon and 7.49 percent of hydrogen.

When the afore-mentioned mixture of basic materials, of the same mixture proportions as afore-mentioned, is heated at 150° C. for 30 minutes, a resin of a melting point from 80 to 88° C. is obtained. This resin can be used directly for baking paints. Also, 100 parts of this resin can be kneaded and mixed under heat with 70 parts of pulp, then pulverized to produce a molding material. Furthermore, a laminated board material can be obtained by impregnating fabric or paper with a solution (for example: 60%) of this solution and meltable resin in benzene, drying the same, then subjecting layers of the same to heating at 170° C. for 90 minutes under a pressure of 200 kilograms per square centimetre.

Example 2

440 parts of xyleneformaldehyde resin (molecular weight: 450, oxygen content: 9.82%), 165 parts of acenaphtheneformaldehyde resin (molecular weight: 680, oxygen content: 1.05%, melting point: 85° C.), and 9.5 parts of xylene sulfonic acid are mixed and heated at 180° C. for only 5 minutes, whereby a substantial quantity of hardened substance is obtained.

When this substance is further heated for another 15 minutes at the same temperature, a relative quantity of 90% of an insoluble, unmeltable, hardened substance is obtained.

A molding material can be produced by mixing 500 parts of wood flour with the aforesaid mixture composition, rolling the resulting mixture at 100° C. for 30 minutes, heating the same at 150° C. for 20 minutes, cooling the same, and pulverizing the same. The resulting material is molded at a temperature of 180° C. and a pressure of 150 kg./cm.$^2$.

Example 3

When 540 parts of xyleneformaldehyde resin (molecular weight: 450, oxygen content: 9.82%), 230 parts of acenaphthylene, and 18.8 parts of xylene sulfonic acid are mixed and heated at 200° C., hardening takes place with vigorous release of moisture. This heating is continued for 30 minutes until the resin is in a fully hardened state. The hardened product is subjected to thermal extraction with benzene, whereby an insoluble, unmeltable product of 97% is obtained. The acenaphthylene initially is in the form of crystals of 93° C. melting point and of yellowish-orange color, but a conspicuous fading of this color is observed as the reaction progresses, and finally the color changes to reddish-brown. The elementally analysis of the hardened product is 92.87% carbon and 7.03% hydrogen.

Example 4

A mixture composed of 170 parts of naphthaleneformaldehyde resin (molecular weight: 540, oxygen content: 5.70%), 100 parts of acenaphthyleneformaldehyde resin (melting point: 130° C.), 3 parts of paratoluene sulfonic acid, and 200 parts of pulp are kneaded at 150° C. in a kneader for 20 minutes, then cooled and pulverized. The resulting material is used as a molding material.

Example 5

When 170 parts of naphthaleneformaldehyde resin (molecular weight: 540, oxygen content: 6.70%), 100 parts of acenaphtheneformaldehyde resin, and 2.7 parts of paratoluene sulfonic acid are mixed and heated at 190° C. for 40 minutes, and insoluble, unmeltable, set resin is obtained.

When 200 parts of wood flour is added to the aforesaid mixture composition, the resulting mixture is kneaded at 130° C. in a kneader, and then pulverized after heating of 30 minutes, a molding material is obtained. This material can be pressure molded at 250 kg./cm.$^2$ and 200° C. in 30 minutes.

Example 6

When 100 parts of naphthaleneformaldehyde resin (molecular weight: 540, oxygen content: 6.70%), 100 parts of xyleneformaldehyde resin (molecular weight: 450, oxygen content: 9.82%), 50 parts of acenaphthylene, 70 parts of acenaphthene formaldehyde resin (molecular weight: 600, oxygen content: 1.21%) and 3.9 parts of xylene sulfonic acid are mixed and heated at 220° C. for 40 minutes, a xylene thermal extraction, insoluble part of 89% content remains. An elementary analysis of the insoluble part of 93.07% carbon and 6.80% hydrogen is indicated. On the other hand, the elementary analysis of the resin part wherein the xylene of the soluble part has been evaporated off under reduced pressure is 93.52% carbon and 6.40% hydrogen. Both the soluble part and the insoluble part have no oxygen content and are composed of only hydrocarbons.

Example 7

106 parts of metaxylene, 53 parts of anthracene, 160 parts of 37% formalin, and 36 parts of concentrated (98%) sulfuric acid are mixed and subjected to reflux heating and agitation at 100° C. for 5 hours. After the reaction, the formalin-sulfuric acid mixture in the lower level is separated out. The remainder is water washed and distilled with aqueous steam to evaporate off unreacted metaxylene. When the residue resin is concentrated under reduced pressure, 147 parts of metaxyleneanthraceneformaldehyde resin of molecular weight of 520 and oxygen content of 7.10% is obtained. This is a tenacious resin of light yellowish brown color.

When 100 parts of the metaxyleneanthracene-formaldehyde resin obtained as above-described, 50 parts of acenaphtheneformaldehyde resin, and 2.0 parts of paratoluene sulfonic acid are mixed and heated at 190° C. for 30 minutes, an 85%, insoluble, unmeltable resin is obtained.

Since it is obvious that many changes and modifications can be made in the above-described details without departing from the nature and spirit of the invention, it is to be understood that the invention is not to be limited to the details described herein except as set forth in the appended claims.

What we claim is:

1. A process of producing thermosetting resins which comprises preparing an aromatic hydrocarbon-formaldehyde resin containing oxygen wherein said oxygen is in a group selected from ether and acetal and said aromatic hydrocarbon is selected from the group consisting of a mononuclear aromatic hydrocarbon containing one to four methyl substituents, naphthalene, α-methyl-naphthalene, β-methyl-naphthalene, anthracene, and mixtures thereof, condensing by heating at a temperature of the order of 140°–220° C. in the presence of an acid catalyst, said aromatic hydrocarbon-formaldehyde resin with at least one reactant selected from the group consisting of acenaphthene, acenaphthylene, their resinous formaldehyde reaction products, and mixtures thereof, the oxygen containing group thereby reacting with said reactant to split out water, and continuing said heating to produce a fully, thermally hardened resin, substantially free of oxyen.

2. A process of producing thermosetting hydrocarbon resins which comprises preparing an aromatic hydrocarbon-formaldehyde resin having an oxygen content of the order of 5.70% to 9.82% by weight, said oxygen being in a group selected from ether and acetal by reaction of at least one compound selected from the group consisting of a mononuclear aromatic hydrocarbon containing one to four methyl substituents, naphthalene, α-methyl-naphthalene, β-methyl-naphthalene, anthracene, and mixtures thereof with a member of the group consisting of formaldehyde and paraformaldehyde, in the presence of an acid catalyst, condensing by heating at a temperature of the order of 140° to 220° C. in the presence of an acid catalyst, said aromatic hydrocarbon-formaldehyde resin with at least one reactant selected from the group which consists of acenaphthene, acenaphthylene, their resinous formaldehyde reaction products, and mixtures thereof, the oxygen containing group thereby reacting with said reactant to split out water, and continuing said heating to produce a fully, thermally-hardened resin substantially free of oxygen.

3. A process of producing thermosetting hydrocarbon resins, which comprises preparing an aromatic hydrocarbon-formaldehyde resin containing oxygen, wherein said aromatic hydrocarbon is selected from the group consisting of a mononuclear aromatic hydrocarbon containing one to four methyl substitutents, naphthalene, α-methyl-naphthalene, β-methyl-naphthalene, anthracene, and mixtures thereof and condensing said aromatic hydrocarbon-formaldehyde resin with at least one reactant selected from the group consisting of acenaphthene, acenaphthylene, their resinous formaldehyde reaction products, and mixtures thereof by heating in the presence of acid catalyst, said oxygen reacting with said reactant to split out water, thereby producing a hardened resin substantially free of oxygen.

4. A thermosetting aromatic hydrocarbon resin which is produced by the process which comprises preparing an aromatic hydrocarbon-formaldehyde resin containing oxygen, wherein said aromatic hydrocarbon is selected from the group consisting of a mononuclear aromatic hydrocarbon containing one to four methyl substituents, naphthalene, α-methyl-naphthalene, β-methyl-naphthalene, anthracene, and mixtures thereof and condensing said aromatic hydrocarbon-formaldehyde resin with at least one reactant selected from the group consisting of acenaphthene, acenaphthylene, their resinous formaldehyde reaction products, and mixtures thereof by heating in the presence of an acid catalyst, thereby producing a hardened resin composed solely of hydrocarbons.

5. A process of producing thermosetting hydrocarbon resins as defined in claim 3, wherein said reactant is a formaldehyde acenaphthylene resin.

6. A process of producing thermosetting hydrocarbon resins as defined in claim 3, wherein the reactant is a formaldehyde acenaphthene resin.

7. A process as defined in claim 3, wherein the catalyst consists of 0.1–2.0% of an aromatic sulfonic acid.

References Cited by the Examiner

UNITED STATES PATENTS

| | | | |
|---|---|---|---|
| 2,954,360 | 9/60 | Krzikalla et al. | 260—67 |
| 2,958,676 | 11/60 | Krzikalla et al. | 260—67 |

FOREIGN PATENTS 680,343   10/52   Great Britain.

OTHER REFERENCES

Wegler: Angew. Chem. A/60, Jahrg., 1948, NR. 4, pages 88–96.

MURRAY TILLMAN, *Primary Examiner.*

LEON J. BERCOVITZ, WILLIAM H. SHORT,
*Examiners.*